April 20, 1965

W. E. SAVAGE 3,179,471

POWDER VALVE AND DISCHARGE METHOD

Filed June 20, 1962

INVENTOR:
WILLIAM E. SAVAGE
BY: Oswald H. Milmore
HIS ATTORNEY

3,179,471
POWDER VALVE AND DISCHARGE METHOD
William E. Savage, Castro Valley, Calif., assignor to Shell Oil Company, New York, N.Y., a corporation of Delaware
Filed June 20, 1962, Ser. No. 203,975
10 Claims. (Cl. 302—42)

The invention relates to the continuous discharge of pulverulent material from a pressurized zone which contains said material and a gas, and is directed to restricting the discharge of said gas with the solids. The invention is useful, for example, for recovering powder from a vapor stream with only a minimal escape of gas from the high-pressure zone, which may be a closed vessel or a flow line but will herein be exemplified as a separator wherein the powder is concentrated.

There is frequent need in industry to separate small solids from a high-pressure gas without depressurizing a significant or an excessive quantity of the gas. This need arises, for example, in chemical processes wherein the gas is a vaporized solvent which must be recycled at elevated pressure to a polymerization or reaction zone. "High-pressure letdown" describes the recovery of powder from a high-pressure gas with a minimal escape of gas with the powder from the high-pressure zone. The latter zone may contain the solids substantially dispersed in the gas but more usually is a unit which concentrates the solids, as in the case of a cyclone or filter chamber.

Various high-pressure letdown systems are known. Lock-type devices—among which are star valves and rotary or linearly reciprocating valves which provide pockets placed into communication alternately with the feed and discharge passages—are subject to rapid wear, especially with some types of solids, leading to excessively high gas leakage or blow-by when operated at high pressure differences between their feed and discharge sides. Another known system is the "blow-case," in which a pressure vessel is fitted with inlet and discharge valves at the top and bottom, respectively, and said valves are operated sequentially, whereby the vessel acts as a lock. The weak point is again leakage and wear in the valves and the intermittent nature of their operation, which makes it necessary to provide blow-cases in pairs so that by alternating their intake cycles the source vessel or cyclone need not provide powder storage during the discharge cycle of the blow-case.

It is also known to use as continuous-flow letdown devices various throttling valves, such as guillotine and adjustable iris types, which provide more or less square or circular orifices, and needle and sphincter types, which provide annular or linear slits of variable widths but substantially fixed lengths. Difficulties experienced with such valves include poor controllability of the rate of solids discharge and unreliability particularly when the solids are not free-flowing. With such valves it is not practicable to regulate the solids flow rate independently of the gas-to-solids ratio in the discharged stream because any increase in the width of the orifice or slit to accommodate more solids permits a disproportionately greater quantity of gas to escape.

The gas-to-solids ratio in the effluent stream is lowest when the valve passage is so small that incipient bridging of the solids at the entrance to the passage occurs. However, as the rate of solids flow increases it becomes necessary to enlarge the passage, leading to excessive loss of gas with the known devices. Further, because the exact passage size is difficult to determine and is variable with fluctuations in the composition of the source stream and nature of the solids, it is in practice necessary to operate the valve continually, often at a frequency of 10 to 60 cycles per minute, to vary the passage, usually between positions in which that passage is too large and too small. Devices for controlling the movement of the valve have, heretofore, not been satisfactory for various reasons.

It is, therefore, the object of the invention to provide an improved method and apparatus for high-pressure letdown, wherein pulverulent material is discharged from a high-pressure zone which also contains gas with but a minimal loss of gas.

A specific object is to provide a high-pressure letdown valve which can be adjusted for different rates of solids flow independently of the control of the valve which is used to maintain it at the incipient bridging condition.

Still another object is to provide a method and apparatus for controlling the operation of the letdown valve in accordance with the gas-to-solids ratio in the stream issuing from the valve.

In summary, the letdown valve of the invention provides a passage in the form of a slit of which the length and width can be adjusted independently, said slit having a length which is at least several times the width and the width being preferably substantially uniform throughout its length.

The method involves adjusting the length of the slit in accordance with the desired overall rate of flow of solids and control of the gas-to-solids ratio in the stream flowing through the slit by adjusting the slit width. The latter may lead to substantially the minimum gas-to-solids ratio, or to any desired ratio, which may but need not be close to said minimum.

The said control is preferably effected automatically by measuring a thermodynamic property of the stream, i.e., a property related to the pressure change or temperature change in the stream, and providing a motor or valve operator which alters the slit width slowly or in small steps in accordance with the measured value of said property, so as to maintain the property at a selected value. This regulates the gas-to-solids ratio, often holding it at a desired level, which may be a constant or the minimum attainable for the prevailing solids flow rate and slit length. Among the suitable methods for measuring the said thermodynamic property are:

(a) Measurement of the flow rate of the gas, e.g., in terms of the resistance of the issuing stream through a duct. Thus, one can measure the pressure difference between two points spaced along a duct; or the stream from the duct can be flowed into a chamber which is maintained at a constant pressure, e.g., atmospheric, superatmospheric or sub-atmospheric pressure, and the pressure at an upstream point in the duct can be measured. When the gas flow increases it moves at high velocity and causes a high flow resistance. In this case the slit width is preferably controlled to maintain the flow resistance at a constant, low value. When the solids flow at constant rate the flow resistance is an indication of the gas-to-solids ratio.

(b) Measurement of the temperature reduction of the gas upon flowing through the valve, whether due to expansion or loss by radiation. Due to the Joule-Thomson effect the gas stream is cooled by flow through the slit. However, the solids are not similarly cooled, and tend to maintain the gas at its original temperature, whereby a decreased temperature reduction corresponds to a decreased gas-to-solids ratio. Hence the slit width can in this case be controlled to maintain the temperature reduction at a minimum, although it can be controlled, if desired, to a constant value.

In situations in which the temperature in the high-pressure zone is above ambient, there will be additional cooling of the down-stream duct by radiation, and this is effective to indicate a large temperature drop when the gas flow ceases or almost ceases. The solids carry more heat, counteracting cooling due to radiation. Hence, this similarly makes it possible to control the slit width by maintaining the lowest attainable temperature reduction.

It may be observed that, in both situations, it is assumed that the slit is neither closed entirely nor to the point at which the bridging effect of the pulverulent material at the upstream side of the slit prevents passage of the solids. In these situations the clean gas flowing out of the high-pressure zone would eventually become burdened with solids. Operation under this undesirable condition can be prevented by any of various expedients. For example, in (a), the predetermined constant flow resistance is chosen sufficiently high to prevent closing of the slit width to the extent that no solids are passed, and/or the system can be provided with an overriding monitoring controller which is responsive to the presence of solids or excessive amounts of solids in the clean gas effluent to increase the slit width. It is evident that the gas-to-solids ratio will in this case usually not be the minimum but that it can be made close to the minimum. In case (b) the temperature reduction increases when the slit width is either greater or smaller than the optimum for minimum gas-to-solids ratio, whereby the controller tends to prevent closing of the valve to the extent of entering the above undesired condition. However, in this case it is also possible to apply the overriding monitoring controller for increasing the slit width if solids occur or occur in excessive amount in the clean gas. This overriding control, but briefly described herein, is further described and claimed in my copending application Serial No. 203,976, filed concurrently herewith. Finally, it is sometimes possible to provide the valve with a stop to limit the extent to which the slit closes.

Control of the slit size to accommodate the flow of the desired overall or average amount of the solids through the slit is achieved by varying the slit length either manually or automatically. This can, in many instances, be adjusted only occasionally or can be pre-set in instances wherein the rate of solids flow through the system is steady. In others, however, it is desirable to vary the slit length continually according to the total solids flow. When the rate of solids flow is reasonably constant manual adjustments of the slit lentgh may be suitable for long runs. The slit length is in most cases adjusted to the minimum necessary to pass the required flow of solids through the slit when the latter has a width which is the minimum or almost the minimum required to pass the solids. The exceptional case is that wherein the slit width is controlled to attain a constant gas-to-solids ratio which is somewhat above the minimum; in this case the slit length may also be selected as above stated but may be slightly shorter or longer.

When automatic control of the slit length during operation is practiced, the total solids flow rate is measured in any suitable manner. Among the methods suitable for this are:

(a) Measurement of the rate at which solids are supplied to the high-pressure zone. For example, when the method is applied to the recovery of polymers from a slurry in a volatile hydrocarbon which is flashed off to produce the gas, the density of the slurry can be measured by a gamma-ray density meter to find the polymer concentration; this, taken with the slurry flow rate, measured by any suitable flow-measuring device, yields the solids flow rate.

(b) Measurement of the rate at which the solids are collected downstream of the letdown valve. A specific example is the impingement or mass flow meter, which is a device which measures the force of the solids against a balance plate onto which the collected stream of solids falls through a predetermined height.

The valve suitable for practicing the above method includes a body providing a flow passage and control means for varying the slit length and width independently. In one practical embodiment a single controller performs both functions; it is movable relatively to said body independently along each of two axes which are transverse to the axis of said passage, said controller obstructing all of said passage area save a slit-shaped area and the width and length of said slit being independently adjustable by movement of the controller along said first-mentioned axes either or both of which may be linear or arcuate. The said body may be a valve housing having a flow passage extending therethrough and a bore intersecting said passage and the controller is a plunger or spindle which is reciprocable along and rotatable within said bore; either the length or the width of the slit may be varied by the reciprocating movement, depending upon the selected geometry of the passage through the valve body and the control spindle. In a preferred arrangement the control spindle contains a flow passage which can be moved into partial registry with the passage in the valve body. In this embodiment one axis of movement is straight and the other is arcuate; both are straight when the controller is a flat plate and both are arcuate when it is spherical. To increase the capacity of such a device both the valve body and controller may have a plurality of passages which are simultaneously controlled.

The invention is founded on the following concepts and discoveries: the restricted flow passage through the letdown valve should be slit-shaped, e.g., be elongated and of more or less uniform width, and the width should be at the minimum which will pass the solids without bridging. The flow capacity of the slit is then altered by changing the slit length instead of its width; the width is not subjected to rapid or cyclic variations and the changes are kept small. The ratio of gas to solids in the issuing stream can be critically controlled by the slit width, particularly at high gas velocities which, in the preferred mode of operation, are sonic or near sonic. Sonic velocities occur when the pressure drop across the slit exceeds the critical pressure ratio. Under these conditions the solids within the slit, which are moving more slowly, impose very large interference with the flow of gas by reducing the open area of the slit available for gas flow. The solid particles are slowed down by mutual interference and by friction with the walls of the slit.

Stated otherwise, the concept of the invention involves the critical control of the slit width to attain the desired, e.g., the minimum, gas-to-solids ratio instead of changing the width by small changes to vary the solids-handling capacity. The capacity is controlled by altering the slit length. In this manner it was found to be possible to attain more effective control of the gas-to-solids ratios in the issuing stream than that possible by increasing or decreasing the slit or orifice width to pass larger or smaller amounts of solids or by continual fluctuation in the orifice or slit size, as in the prior practice. In the latter cases the solid particles in the slit are less effective to obstruct the gas flow and relatively greater and more variable quantities of gas gush through the slit.

The invention will be further described with reference to the accompanying drawings forming a part of this specification and showing certain preferred embodiments by way of illustration, wherein:

FIGURE 3 is a sectional view taken on the line 3—3 of FIGURE 2;

FIGURE 4 is a fragmentary plan view of the valve, looking in the direction of the arrows 4—4 of FIGURE 2;

FIGURE 5 is a sectional view taken on the line 5—5 of FIGURE 2; and

FIGURE 6 is a diagrammatic view of a letdown system showing a modified control for the slit width.

Figure 1:
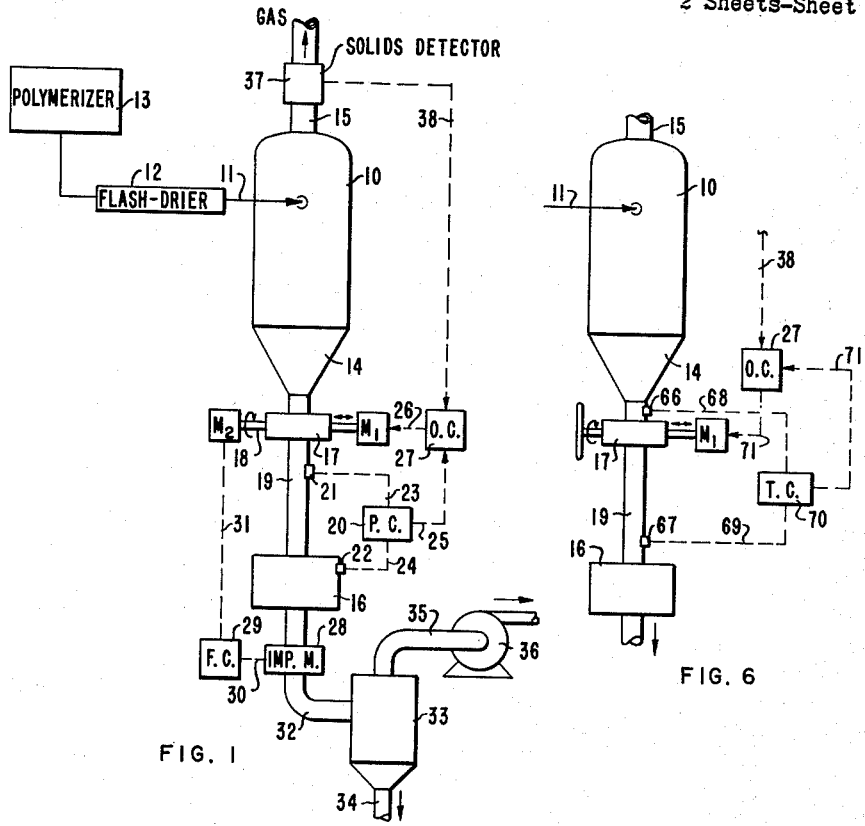
FIGURE 1 is a diagramamtic view of a letdown system to which the invention is applied, showing the control system.
Figure 2:
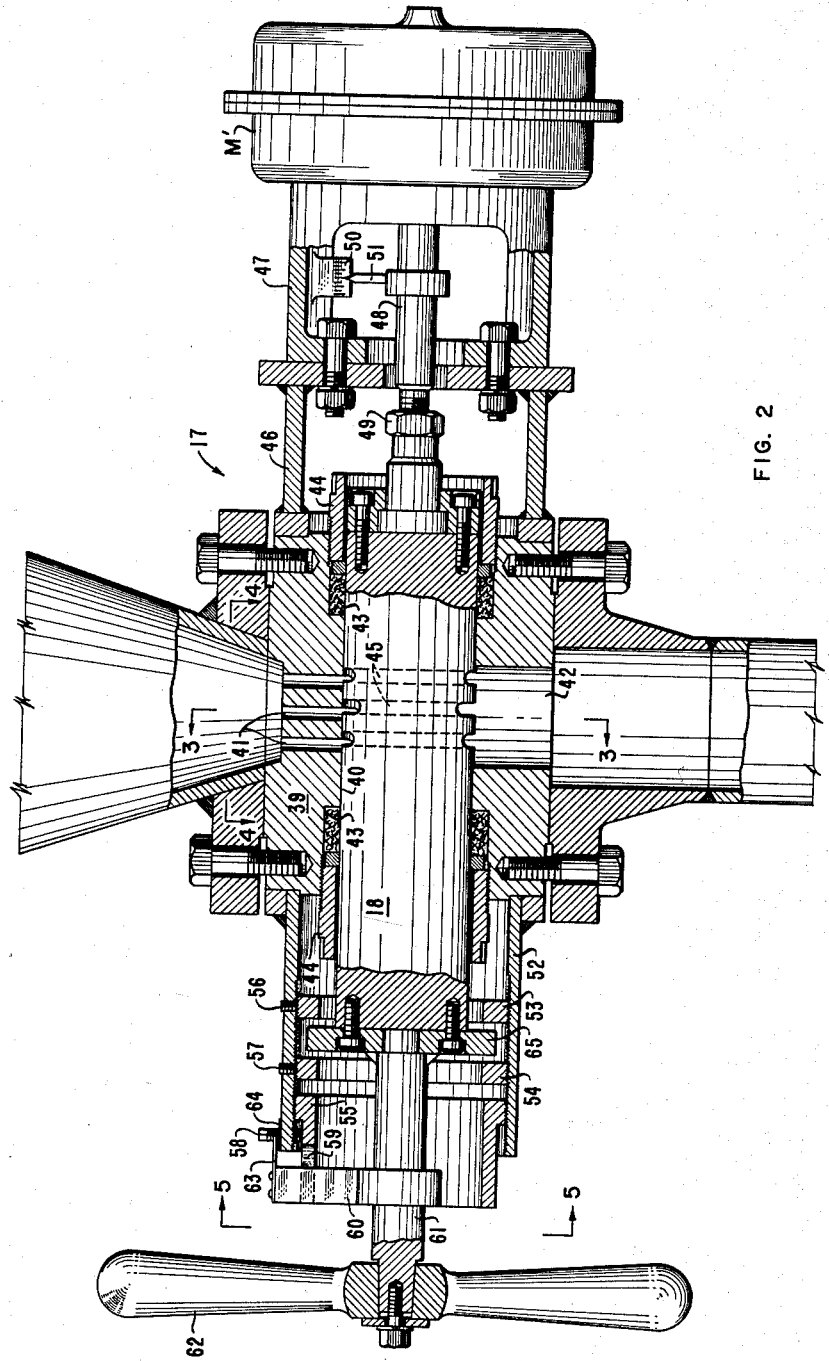
FIGURE 2 is a longitudinal sectional view of the letdown valve.

Referring to FIGURE 1, the high-pressure zone is embodied by a cyclone separator 10 to which a suspension of pulverulent solids in a gas at elevated pressure is admitted tangentially from a line 11. This may, for example, be a suspension of solid particles of polypropylene in vaporized hydrocarbon solvent, such as propylene monomer and butane, having a pressure of 100 to 400 lbs. per sq. in., produced by vaporizing the solvent in a flash-drier 12 from a slurry produced in a polymerizing unit 13. The solids settle in the conical bottom 14 of the cyclone and are thereby concentrated, and the clean gas flows out at the top through a central pipe 15. It is desired to recover the clean gas at elevated pressure, to permit recycling to the unit 13 after condensation, and to discharge the separated solids from the cyclone to a low-pressure zone, such as a receiving chamber 16 which may, for example, be at atmospheric pressure or at some other pressure, which may be held constant by suitable means, not shown. Usually the ratio of the pressures across the valve 17 exceeds the critical pressure ratio. Further, it is desired to flow only a small quantity of gas from the cyclone to the receiving chamber. In this embodiment it is assumed that it is desired to flow gas through the valve at a uniform rate.

The removal of solids from the cyclone is effected by discharge of the concentrated solids through the letdown valve 17 of the invention, the said valve comprising a control spindle 18 capable of independent longitudinal and rotary motion, as will appear, for varying, respectively, the width and length of a slit provided therein. Longitudinal and rotary motions are imparted to the spindle by electric or pneumatic motors $M_1$ and $M_2$, respectively, it being understood that either and particularly the latter may be omitted when manual control of either or both spindle movements is/are used. The solids issuing from the valve flow through a conduit 19 into the chamber 16 and the flow resistance of the conduit 19 is measured by a pressure controller 20 which receives indications of the pressures at points spaced along the conduit, e.g., at an upstream point in the conduit and in the chamber 16, from pressure-sensitive cells 21 and 22 via lines 23 and 24, respectively. (When the chamber 16 is operated at a constant pressure the cell 22 and its control line 24 may be omitted. In either case the controller 20 measures the thermodynamic property known as pressure drop.) The output from the controller 20 is transmitted via line 25 and 26 and, optionally, an overriding controller 27 (to be described) to control the motor $M_1$ so as to increase or decrease the slit width to achieve the desired gas flow, that is, to attain that slit width at which the pressure difference between the elements 21 and 22 is at a preselected value, which can be adjusted by varying the set point of the controller 20.

The solids from the chamber 16 may optionally be passed through a meter to measure the solids flow rate. This may, for example, be a mass flow meter, specifically an impingement meter 28, known per se, which emits a signal to a flow controller 29 via a line 30. The output from controller 29 is transmitted via a line 31 to control the motor $M_2$ so as to increase the slit length as the solids flow rate increases, and vice versa. Solids and gas are discharged through a conduit 32 to a separator 33, e.g., a filter unit, from which solids are discharged at 34 to subsequent processing unit, such as one wherein residual gas is purged from the solids.

The gas discharged via the duct 35 must in many instances be re-compressed to permit recycling, as to the polymerizing unit 13, in a compressor 36. Usually the compressor has a fixed maximum capacity, and the rate at which the gas escapes through the letdown valve 17 should not exceed the compressor capacity. The controller 20 prevents a gas escape rate which is greater than the set point. It may be noted that the low pressure within the chamber 16 need not be independently controlled, but may be determined by the compressor 36; in this event the set point of the controller 20 should be somewhat lower than the compressor capacity to obviate a rise in the pressure in chamber 16 which would spuriously indicate a fall in gas flow. Further, for any given rate of solids flow, the controller 20 governs the gas-to-solids ratio in the effluent stream.

The clean gas from the pipe 15 may optionally be flowed through a solids detector 37 of any suitable type, such as a gamma-ray or optical density meter, for detecting the presence of solids in the gas. When such solids are sensed a signal is transmitted via a line 38 to the overriding controller 27. This controller normally transmits to line 26 the signal from the line 25; however, when it receives a signal via line 38 it impresses on the line 26 a signal which causes the motor $M_1$ to increase the slit width and thereby increase the flow through the valve 17. When the signal in the line 38 ceases, normal operation is resumed.

The function of the overriding controller 27 and the detector 37 are to guard against any abnormal functioning of the valve 17. Thus, it may happen that, for any reason, bridging occurs at the entrance to the slit in the valve 17, which filters out solids and permits only gas to flow. The stream in the conduit 19 now has a very high gas-to-solids ratio, and this ratio will not be decreased by further narrowing of the slit. The ultimate result is that solids are carried off with the clean gas. When this occurs the overriding controller 27 transmits a signal to open the slit and thereby purge the accumulated solids until the clean gas is free from solids.

It may be noted that the various measuring and controlling devices are well know per se and are, for this reason, not further described; and that the various lines shown dashed in the drawings and connected to these devices may be electrical, pneumatic or mechanical. When a pneumatic system is used the controller 27 may be an adding relay, which transmits to pneumatic motor $M_1$, a signal equal to the sum of the pressures in the lines 25 and 38, and the motor $M_1$ is then connected to increase the slit width upon a rise in signal pressure.

Considering next the letdown valve 17 itself, reference is made to FIGURES 2–5. The valve includes a valve housing or body 39 formed with a horizontal, cylindrical bore 40 and with a vertical flow passage intersecting said bore, the passage comprising at the top one or more, e.g., three entrance holes 41 and at the bottom a single discharge hole 42. The holes 41 are thin in the direction of the bore axis and elongated circumferentially to form wide slots. The bore 40 contains the control spindle 18 which is axially slidable and rotatable and sealed on both sides of the passage by sealing rings 43 and packing glands 44. The spindle 18 contains one or more wide slots 45 extending therethrough to interconnecting the several slots 41 to the hole 42 and positioned for simultaneous registry with the former. It is evident that an axial displacement of the spindle from the position shown decreases the width of the slit-shaped passage between the slots 41 and 45, while rotation of the spindle from that position decreases the lengths of said slits, said lengths extending circumferentially about the upper part of the spindle.

The right end of the body 39 carries a yoke 46 to which is bolted a bracket 47 carrying the motor $M_1$ and containing an axially reciprocable actuating rod 48 which is moved by the motor. The rod 48 has a rotatable connection 49 to the spindle 18, whereby the latter is shifted axially but is free to rotate with respect to the rod 48. The bracket may carry a scale 50 carrying indicia which cooperate with an indicator 51 mounted on the rod 48.

The other end of the valve body carries a locking housing 52 which is internally threaded and contains stop rings 53 and 54 and a locking bushing 55, the last three parts being externally threaded and secured against rotation by set screws 56, 57 and 58. The bushing 55 has a longitudinal slot 59 which retains a radial dog 60 against relative rotation. The dog is fixed to a shaft 61 which is, in turn, fixed to the end of the spindle 18 and carries a handwheel 62. The outer end of the dog 60 carries an indicator 63 which cooperates with indicia on a scale 64 mounted on the housing 52. The stop rings 53 and 54 limit axial movement of the spindle by butment with a plate 65 which is fixed to the end of the spindle 18. Preferably the stop rings are set to prevent complete closing of the slit. For example, they can be set to permit variations of the slit width between 0.012 and 0.25 inch, but the range depends on the particle size.

To adjust the angular position of the spindle the set screw 58 is loosened and the spindle is turned by the handwheel 62, thereby rotating both the spindle and the bushing 55. Thereafter the set screw 58 is tightened; the dog 60 can slide axially within the slot 56 as the spindle reciprocates but is held against rotation.

The embodiment shown in FIGURES 2–5 does not employ a motor $M_2$ for rotating the spindle and is suitable for installations in which the flow of solids is uniform over extended periods so that only occasional adjustment of the slit length must be made. However, a motor $M_2$, as is shown in FIGURE 1, may be applied to vary the slit length automatically.

Referring to FIGURE 6, the system is like that of FIGURE 1 and like reference numbers denote like elements. The system differs in that the gas-to-solids ratio is measured by measuring the thermo-dynamic property known as temperature reduction of the gas in flow through the slit valve 17. To this end there are provided temperature-measuring devices 66 and 67, such as thermocouples, mounted to measure the gas temperature upstream and downstream from the valve and connected by lines 68 and 69 to a differential temperature controller 70. This controller is connected by lines 71 and 72 to the motor $M_1$, optionally through an overriding controller 27 as was previously described. The controller 70 is of the type that transmits via the line 71 a control signal to the motor $M_1$ to position the spindle 18 in such a way that the slit width in the valve 17 increases when a change in width tends to lower the temperature difference between the devices 66 and 67. Controllers of this type are known per se. In one form, it emits internal electrical signals of either positive or negative polarity at intervals to position a pressure-regulating valve. It further includes a memory unit, such as a potentiometric null device, for comparing the temperature difference before and after a change in the control signal. If the measured temperature difference decreases, another internal electrical signal of the same polarity is emitted to alter the level of the control signal in the same direction; if the temperature difference increases, an internal electrical signal of opposite polarity is emitted to alter the level of the control signal in the opposite sense. The control signal, therefore, is altered in small steps.

It is evident that the device 66 and the line 68 may be omitted when the temperature in the zone 10 does not vary suddenly; in that case the controller 70 operates to maintain the maximum temperature possible at the downstream device 67.

As was explained earlier, the gas is cooled by the Joule-Thomson effect in flowing through the slit in the valve 17, and this cooling effect becomes smaller as the quantity of solids flowing through the slit increases. Hence, by establishing and maintaining the smallest temperature differential (or the highest temperature at the downstream device 67 when only one is used) the effluent stream has the minimum gas-to-solids ratio. This is possible with the technique described because, as the slit width increases from its optimum for the minimal gas-to-solids ratio, the solids are less effective to obstruct the slit, causing a larger current of gas to flow through the slit; and during the initial decrease in slit width from the said optimum width, progressively more solids are hindered from passing, being retained at the slit entrance by bridging, while the gas continues to flow, encountering decreased resistance in the slit although increased resistance in flowing through the bridge. Of course, continued reduction in the slit width leads eventually to reduced gas flow; however, this occurs with slit widths smaller than those which are encountered in the normal operation. Should the slit width be for any reason reduced so far as to cause operation under this undesirable condition the overriding controller 27, when used, acts to increase the slit width, as was decribed in connection with FIGURE 1. In addition to the Joule-Thomson effect, there is also cooling due to loss of heat by radiation and connection when the temperature upstream of the valve 17 is above ambient temperature.

I claim as my invention:

1. A high-pressure letdown method for discharging pulverulent solids from a high-pressure zone which contains said solids and gas into a low-pressure zone, said method comprising:
   (a) flowing said pulverulent solids and gas from said high-pressure zone into said low-pressure zone through a slit having a length longer than several times its width,
   (b) adjusting the length of said slit in accordance with the desired overall rate of flow solids,
   (c) measuring a thermodynamic property of the stream flowing between said zones, said property being indicative of the gas flow rate in said stream, and
   (d) adjusting the width of said slit in accordance with the measured value of said property of said stream so as to reduce the gas-to-solids ratio in said stream.

2. Method as defined in claim 1 wherein said thermodynamic property is pressure drop of the stream across a flow resistance downstream of said slit.

3. Method according to claim 2 wherein said slit width is adjusted to maintain said resistance at a constant value.

4. Method as defined in claim 1 wherein said thermodynamic property is the lowering of the temperature of the stream in flowing through said slit.

5. Method according to claim 4 wherein said slit width is adjusted to maintain said temperature reduction at a minimum.

6. A high-pressure letdown system for discharging pulverulent solids and gas from a high-pressure zone which contains said solids and gas into a low-pressure zone, said system comprising:
   (a) a valve situated between the high-pressure zone and the low-pressure zone;
   (b) said valve having a body provided with a flow passage therethrough;
   (c) control means for obstructing a part of said passage and leaving a slit-shaped area thereof unobstructed, said area having a length at least several times its width, said control means being movable relatively to said body to vary the width and length of said slit independently of one another;
   (d) means for measuring the rate at which solids are flowed through said slit;
   (e) means responsive to the measured solids flow rate for adjusting the length of said slit, said means increasing the slit length upon an increase in the solids flow rate and decreasing said length upon a decrease in said rate;
   (f) means for measuring a thermodynamic property of the mixture of solids and gas which is discharged through said slit; and
   (g) means responsive to the measured value of said property for varying the slit width.

7. A high-pressure letdown system as set forth in claim 6 wherein said measured thermodynamic property is the rate of gas flow through the slit.

8. A high-pressure let down system as set forth in claim 6 wherein said measured thermodynamic property is the temperature reduction of the gas flowing through said slit.

9. A high-pressure letdown valve for discharging pulverulent solids and gas from a high-pressure zone in such a manner that the gas-to-solids ratio is kept at a minimum, said valve comprising:
 (a) a housing having a cylindrical bore;
 (b) said housing being formed with a flow passage intersecting said bore on a line extending perpendicular to the longitudinal axis of said cylindrical bore;
 (c) said passage being formed on one side of said bore with a circumferentially elongated entrance hole and on the opposite side of said bore with a discharge hole;
 (d) a control spindle axially and rotatably movable relative to said housing and mounted in said bore in sealing relation thereto;
 (e) said spindle having a slot extending therethrough;
 (f) the radially outermost edges of the spindle slot providing a wall cooperating with the edges of the circumferentially elongated entrance hole so that the width and length of the resulting slit-shaped passage from the entrance hole can be varied by axial and rotational movement of said spindle.

10. A high-pressure letdown valve for discharging pulverulent solids and gas from a high-pressure zone in such a manner that the gas-to-solids ratio is kept at a minimum, said valve comprising:
 (a) a housing having a cylindrical bore;
 (b) said housing being formed with a flow passage intersecting said bore on a line extending perpendicular to the longitudinal axis of said cylindrical bore;
 (c) said passage being formed on one side of said bore with a plurality of circumferentially elongated entrance holes and on the opposite side of said bore with a single discharge hole;
 (d) a control spindle axially and rotatably movable relative to said housing and mounted in said bore in sealing relation thereto;
 (e) said spindle having a plurality of slots extending therethough;
 (f) the radially outermost edges of the spindle slots providing walls cooperating with the edges of the corresponding circumferentially elongated entrance holes so that the width and length of the resulting slit-shaped passage from the entrance holes can be varied by axial and rotation movement of said spindle.

References Cited by the Examiner
UNITED STATES PATENTS

| | | | |
|---|---|---|---|
| 2,059,364 | 11/36 | Kimball | 251—289 |
| 2,556,780 | 6/51 | Shryock | 137—625.17 |
| 2,905,538 | 9/59 | McIntire | 302—53 |

FOREIGN PATENTS 865,785  4/61  Great Britain.

SAMUEL F. COLEMAN, *Primary Examiner.*

ANDRES H. NIELSEN, ERNEST A. FALLER, JR.,
*Examiners.*